US005566598A

United States Patent [19]

Kawada et al.

[11] Patent Number: 5,566,598

[45] Date of Patent: Oct. 22, 1996

[54] METHOD FOR SURFACE PROCESSING OF A PHOTORECEPTOR BASE FOR ELECTROPHOTOGRAPHY

[75] Inventors: Sunao Kawada; Masataka Inagi; Masao Itoh; Toyotsugu Itoh; Takayoshi Hashimoto; Akira Ohira, all of Hachioji, Japan

[73] Assignee: Konica Corporation, Japan

[21] Appl. No.: 270,173

[22] Filed: Jul. 1, 1994

[30] Foreign Application Priority Data

Jul. 16, 1993 [JP] Japan .................................... 5-177000

[51] Int. Cl.$^6$ ................................ B23B 1/00; B23Q 11/12

[52] U.S. Cl. ................................ 82/1.11; 407/11; 407/119

[58] Field of Search ........................ 82/1.11, 900; 408/56, 408/61; 407/11, 119; 29/DIG. 63

[56] References Cited

U.S. PATENT DOCUMENTS

| | | | |
|---|---|---|---|
| 2,653,517 | 9/1953 | Pigott | 407/11 X |
| 4,829,859 | 5/1989 | Yankoff | 407/11 X |
| 5,170,683 | 12/1992 | Kawada et al. | 407/11 X |
| 5,228,369 | 7/1993 | Itoh et al. | 407/11 X |
| 5,297,657 | 3/1994 | McConkey | 408/61 X |

*Primary Examiner*—S. Thomas Hughes
*Attorney, Agent, or Firm*—Jordan B. Bierman; Bierman and Muserlian

[57] ABSTRACT

A method for cutting a surface of a base of a photoreceptor for electrophotography is disclosed. The method comprises steps of:

(a) supplying an aqueous cutting fluid to the surface of the photoreceptor base;

(b) cutting the surface of the photoreceptor base by a cutting tool comprising a single crystal diamond.

14 Claims, 2 Drawing Sheets

METHOD FOR SURFACE PROCESSING OF A PHOTORECEPTOR BASE FOR ELECTROPHOTOGRAPHY

FIELD OF THE INVENTION

This invention relates to a method for surface processing of a photoreceptor base for an electrophotography.

BACKGROUND OF THE INVENTION

In an electrophotographic copying machine, a digital copier, a laser printer and so forth, it is popular to employ an electrophotographic photoreceptor comprising a photoreceptive layer provided to the top of a (photoreceptor) base of a rotary drum-like electrophotographic photoreceptor (hereinafter sometimes abbreviated to a "base"). As for the materials of a base constituting such an electrophotographic photoreceptor as mentioned above, an aluminium material is preferably used, because of the advantages of its low cost, light weight and processing convenience. A technique for making use of a base of an electrophotographic photoreceptor comprising an aluminium alloy containing silicon and iron each in a proportion within a specific range is disclosed in JP OPI Publication No. 64-86152/1989. A technique for making use of a base of an electrophotographic photoreceptor comprising an aluminium alloy containing silicon, magnesium and iron each in a proportion within a specific range is disclosed in JP OPI Publication No. 64-86154/1989. A technique for making use of a base of an electrophotographic photoreceptor comprising an aluminium alloy containing magnesium, silicon, copper and titanium each in a proportion within a specific range is disclosed in JP OPI Publication No. 64-86155/1989. A technique for making use of a base of an electrophotographic photoreceptor comprising an aluminium alloy containing silicon, iron and magnesium each in a proportion within a specific range and other metals each in a proportion not more than a specific range is disclosed in JP OPI Publication No. 1-123245/1989. A rotary drum type base comprising an aluminium material is generally finished up by cutting the surface of a tubular-shaped raw material. In a cutting process, a cutting fluid is commonly used. A cutting fluid is used for the purposes of cooling, lubricating and washing. The cutting fluids include, typically, those of the petroleum type, polybutene type, kerosene type, white kerosene type and the like. After cutting a base, the base surface is also washed by contact type washing means utilizing a brush and/or an abrasive, for preventing a defective image production.

As for the concrete techniques relating to a method for surface processing of a photoreceptor base of an electrophotographic photoreceptor, the following techniques have so far been proposed.

(1) A technique for processing the base of an electrophotographic photoreceptor, by making use of a cutting oil containing an oiliness improving agent and/or an extreme-pressure additive in a proportion of not more than 10% by weight, (See Japanese Patent Publication Open to Public Inspection -hereinafter referred to as JP OPI Publication-No. 63-307463/1988);

(2) A technique for finishing the surface of the base of an electrophotographic photoreceptor comprising an aluminium alloy containing magnesium, silicon, copper and titanium each in a proportion within a specific range, by making use of a cutting tool having a rounded cutting portion, (See JP OPI Publication No. 64-86151/1989);

(3) A technique for finishing the surface of the base of an electrophotographic photoreceptor comprising an aluminium alloy containing magnesium, silicon and copper each in a proportion within a specific range, by making use of a cutting tool having a rounded cutting portion, (See JP OPI Publication No. 64-86153/1989);

(4) A technique for making use of a surface-processing apparatus that is comprised of a lathe unit, a high-pressure liquid blasting unit and a unit for transporting a base of an electrophotographic photoreceptor, so that the lathe processing and the high-pressure blasting processing can be performed successively and automatically, (See JP OPI Publication No. 1-172573/1989);

(5) A technique in which the base surface of an electrophotographic photoreceptor is so roughened as to have a specific surface roughness by scanning a nozzle connected to a high-pressure water supply source along the surface of the base, with jetting high-pressure water from the orifice of the nozzle to the surface of the base of the electrophotographic photoreceptor, (See JP OPI Publication No.. 63-264764/1988).

In the above-mentioned conventional techniques, however, there may be some instances where an environmental extraneous matter such as aluminium chip, dust and dirt, rust and the like fixedly adhere to a base in such a state where they are incorporated into a cutting oil. For example, if such a state as mentioned above should be allowed to stand for such a long period as for one month or longer and, particularly, under the high temperature and high humidity conditions, the above-mentioned adhered matter is further solidly fixed to the base and the surface of the base is partly corroded (or rusted). There may also be some instances where the corrosion may not be visually confirmed.

Such a corrosion as mentioned above cannot completely be removed neither by dipping a corroded base surface in an organic solvent or a surfactant solution nor by making such a non-contact cleaning as a ultrasonic cleaning and a UV ray/$O_3$ irradiation cleaning. Therefore, when an electrophotographic photoreceptor is constituted by providing a photoreceptive layer to the surface of a base having such a corrosion as mentioned above, an image defect is produced on the corroded portions.

A partial corrosion produced on the surface of a base may be removed to a certain extent by applying a contact cleaning to the base surface with a brush or an abrasive. However, the base surface is scratched according to an aluminium material used, and a photoreceptive layer, particularly a carrier-generation layer, formed on the scratched portion is liable to vary the layer thickness thereof. Therefore, the photoreceptive speed of the photoreceptive layer is so varied as to raise such a problem that a contrast is produced in a halftone image and an image will result in defect.

With a base comprising an aluminium material surface-processed by making use of a cutting oil as in the conventional techniques and for satisfactorily removing the cutting oil therefrom, a cleaning should be made with a fluorocarbon such as Freon 11, 112 and 113, or a chlorine type solvent such as those of trichloroethylene, 1,1,1-trichloroethane, parchloroethylene or methylene chloride. From the viewpoints of ozonosphere destruction and carcinogenicity, it is, therefore, problematic on the environmental pollution and operation safety to make use a lot of such a solvent as mentioned above.

The foregoing technique (5) is to process the surface of a base while jetting high-pressure water. However, there raises such a problem that the surface of a base can hardly be processed uniformly by only jetting high-pressure water.

The foregoing techniques are so developed as to solve the above-mentioned problems.

(6) A technique for cutting the surface of the base of an electrophotographic photoreceptor comprising an aluminium material by making use of a cutting tool comprising a polycrystal diamond sintered compact, with supplying a cutting fluid comprising water to the base surface, (See JP Application No. 2-417448/1990);

(7) A technique for cutting the surface of the base of an electrophotographic photoreceptor comprising an aluminium material by making use of a cutting tool comprising a polycrystal diamond sintered compact, with supplying a cutting fluid comprising a surfactant or an aqueous solution of water-soluble organic solvent to the base surface, (See JP Application No. 2-417449/1990);

(8) A technique for cutting the surface of the base of an electrophotographic photoreceptor comprising an aluminium material by making use of a cutting tool comprising a polycrystal diamond sintered compact, with supplying a cutting fluid comprising a water-soluble organic solvent without containing water to the base surface, (See JP Application No. 2-417447/1990);

According to these techniques, the cause of an image defect was traced as follows. A cut chip, environmental extraneous matter or the like, that is produced when a base was surface-processed, it is fixed to the base surface, through an cutting oil as a binder or it is strongly fixed thereto by decomposing the cutting oil itself and, further, it is strongly fixed thereto by a chemical reaction. The foregoing techniques (6) through (8) each to solve the foregoing problems by making use of water, an aqueous surfactant solution, an aqueous solution of a water-soluble organic solvent or a cutting fluid comprising a water-soluble organic solvent without containing water, each in place of a cutting oil, and then by applying a cutting process to a base surface with the use of a cutting tool comprising a polycrystal diamond sintered compact.

However, the surface of the above-mentioned base of photoreceptor for electrophotography obtained by means of a polycrystal diamond cutting tool does not show a satisfactory specular gloss, having a certain amount of unevenness. On the other hand, in order to produce a photoreceptor having high sensitivity, it is necessary to reduce the thickness of a subbing layer on which a light-sensitive layer is coated. Accordingly, in the case of a base of photoreceptor obtained by the use of a polycrystal diamond cutting tool, the thickness of subbing layer must be increased for flattening the unevenness mentioned above. Therefore, it was difficult to manufacture a photoreceptor having high sensitivity.

Incidentally, a technology to mirror-finish the surface of the base of photoreceptor for electrophotography by means of a monocrystal diamond cutting tool has been known. The mirror-finishing method using a monocrystal diamond cutting tool smoothens the surface of the base through burnishing action of the edge of the blade of the cutting tool which removes unevenness of the surface of the base.

However, the above-mentioned mirror-finishing method by the use of the monocrystal diamond cutting tool requires much lubrication. Accordingly, it was ordinary to use an oil cutting liquid. In addition, the mere replacement of oil cutting liquid with aqueous cutting fluid does not result in a specular gloss on the surface of the base, rather, causing scratches.

Accordingly, so far, an oil cutting fluid has been thought necessary for a mirror-finishing method using a monocrystal diamond cutting tool and use of aqueous cutting fluid has been thought impossible.

SUMMARY OF THE INVENTION

The present inventors have devoted themselves to investigate the functions performed by a cutting fluid in surface-processing an electrophotographic photoreceptor, a cutting fluid supplying method, an amount of a cutting fluid to be supplied and the processing conditions such as the configurations of a cutting tool to be used. Resultingly, the inventors have succeeded in the technical development of providing the base of an electrophotographic photoreceptor excellent in quality, in which a cutting oil is replaced by an aqueous cutting fluid, an aqueous cutting fluid containing a rust preventive, and a cutting is processed by a cutting tool comprising a single crystal diamond; thereby an image defect can be reduced and the following washing can readily be made and, further, any freon or chlorine type solvent may not be used or may be used only in a small amount even if it should be used. A photoreceptor base having a surface of specular gloss is obtained.

It is, accordingly, an object of the invention to provide a surface processing of a photoreceptor base for an electrophotography, that has a surface excellent in washability and few in image defect. The other object is to provide a surface processing of a photoreceptor base having a surface of specular gloss.

Figure 1:
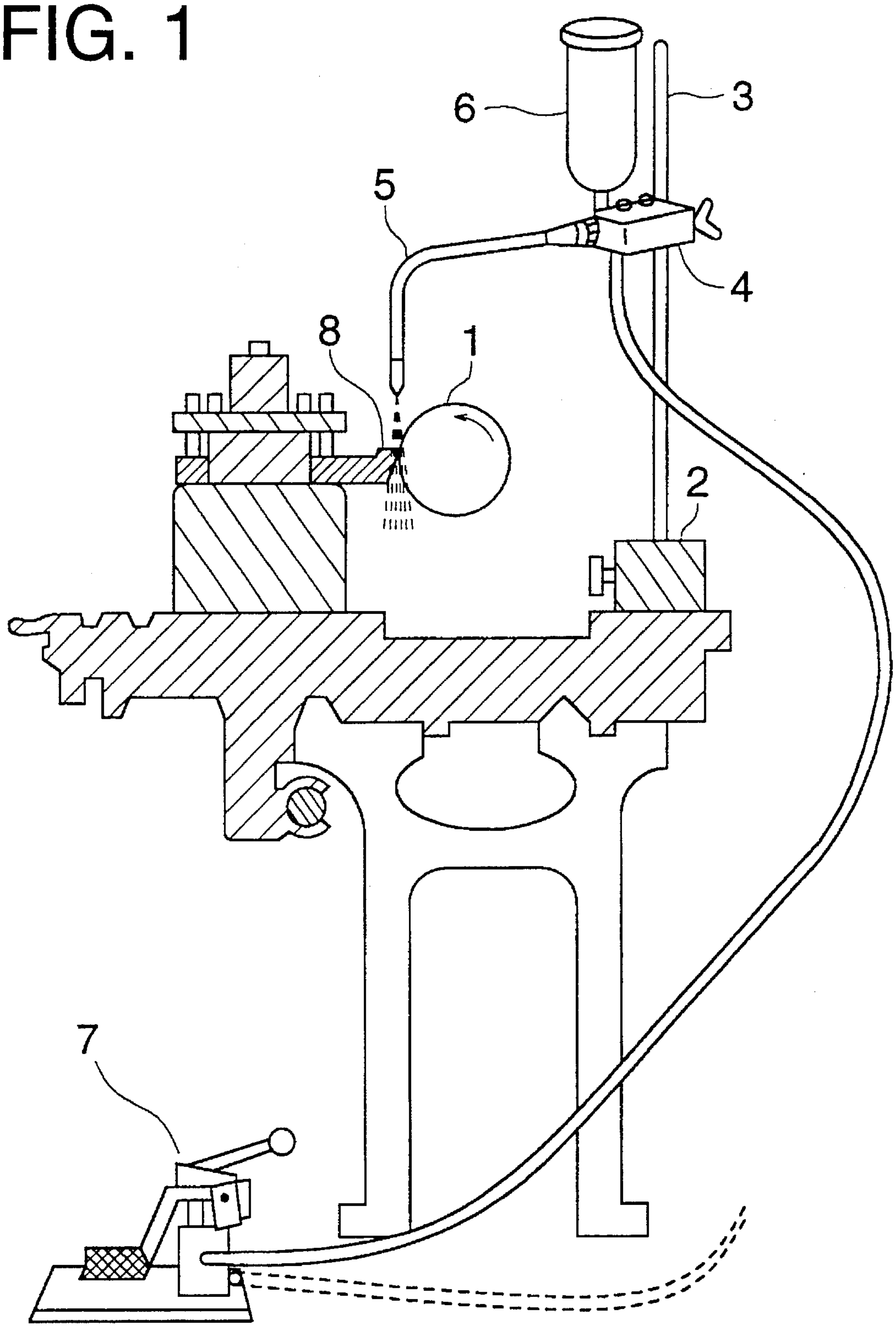
FIG. 1 is an explanatory drawing of a lathe for processing a base.

When making use of an aqueous cutting fluid or a water-soluble organic solvent without containing water as a cutting fluid, an aluminium cut chip and environmental extraneous matter such as dust and dirt may effectively be prevented from fusing or fixing to the surface of an base. Even if an extraneous matter should be made adhered, it does not fixedly adhere. Therefore, the following washing step can easily be performed, so that the productivity can be improved by reducing the number of washing steps. Also when a contact washing step is made with a brush or an abrasive, a scrubbing force may be reduced, so that there may be few possibilities of producing a scratch on a base surface. In addition, when a washing step is made, there may be few necessities for making use of freon or a chlorine type solvent, so that any problems of environmental pollution and operational safety cannot be raised. Further, an aqueous cutting fluid is relatively higher in cooling effect than an oil type cutting fluid. Therefore, the life span of a cutting tool can be prolonged. When water is used as a cutting fluid, the cost of a cutting fluid can be saved. When an aqueous solution of either a surfactant or a water-soluble organic solvent is used as a cutting fluid, an excellent layer is formed of the aqueous solution on the contact interface between a cutting tool and a base. Therefore, a relatively excellent lubricity can be displayed as compared to the case of water and, besides, there may be few possibilities of producing a corrosion on the surface of an electrophotographic photoreceptor comprising an aluminium material. When a water-soluble organic solvent (without containing water) is used as a cutting fluid, it has a further excellent cooling effect than in an aqueous cutting fluid. Therefore, the life span of a cutting tool can also be prolonged. When an aqueous emulsion solution is used as a cutting fluid, an excellent layer can be formed of the cutting fluid on the contact interface between the cutting tool and the base. Therefore, it can display a relatively excellent lubricity as compared to the case of solely making use of water.

The above-mentioned aqueous cutting fluid or a cutting fluid comprising a water-soluble organic solvent containing a rust preventive is effective in pitting corrosion preventability of the base and in rust preventability of a machine tool. Particularly, the maintenance of a machine tool can easily be performed.

EXAMPLES

In the surface processing of the invention, the surface of a base was cut-processed by a cutting tool comprising a single crystal diamond so as to finish the surface to be mirrorwise, while supplying an aqueous cutting fluid, a cutting fluid comprising a water-soluble organic solvent or a cutting fluid comprising a water-soluble organic solvent containing a rust preventive therein.

As for an aluminium material, A 1070, A 1100, A 3003, A 5005, A 5805 and A 6063 specified in JIS were used, respectively. As for the configurations of the base, there was no special limitation thereto but either one of a rotary drum type and an endless sheet belt type could be used.

As for a cutting fluid, an aqueous cutting fluid, a cutting fluid comprising a water-soluble organic solvent or a cutting fluid comprising a water-soluble organic solvent containing a rust preventive therein could be used. The cutting fluid was preferably supplied in the form of mist to the surface of a base by making use of "Magic-Cut" manufactured by Fuso Seiki Co., for example. When making use of such a mist as mentioned above, cut chips produced in cut-processing and an environmental extraneous matter could effectively be prevented from fixedly adhering to the surface of a base. Further, a washing step could easily be performed because cut chips and the like did not fixedly adhere to the surface of a base. Therefore, the necessity for making use of freon or a chlorine type solvent could be reduced, so that there could be few possibilities of raising an environmental sanitation problem. Besides, when applying a contact washing step in which a brush was used, a satisfactory washing could be performed with a relatively weak scrubbing force, so that there was no possibility of producing a damage by which an image defect was caused on the surface of a base. In addition, even if allowing it to stand for a long time, there was no possibility of making a cut chip or an extraneous matter adhered fixedly to the surface of a base.

As for the concrete examples of water only used as a cutting fluid, pure water, ion-exchange water, city water, well water or the mixtures thereof.

From the viewpoints of displaying an excellent buffering function with water mist and preventing a pitting corrosion and a nodular pitting corrosion each produced by a reaction of water mist with aluminium and an added metal when surface-processing a base, it was preferable that a specific resistance of water mist is to be within the range of 2 kΩ/cm to 10 MΩ/cm, a conductivity of water mist is to be within the range of 0.05 to 500 μS/cm and an electrolytic density of water mist is to be within the range of 0.05 to 250 ppm.

From the viewpoints of preventing a nodular pitting corrosion produced by water mist and also preventing the overall-surface corrosion accompanied by a needle-shaped pitting corrosion, it was preferable that the overall hardness of water mist is to be not higher than 50 ppm and a chlorine ion concentration of water mist is to be not higher than 20 ppm. Particularly when a ratio of an overall hardness to a chlorine ion concentration is 1:1, it was preferable, because an overall corrosion was produced, but any image defect was not produced.

As for the other aqueous cutting fluids, an aqueous surfactant solution or an aqueous solution of a water-soluble organic solvent is used.

The above-mentioned surfactants include, for example; an anionic surfactant such as a higher alkylsulfonate, a higher alcohol sulfate, a phosphate and a carboxylate; a cationic surfactant such as benzalkonium chloride, a Sapamine type quaternary ammonium salt, a pyridinium salt and an amine salt; an amphoteric surfactant such as those of the amino acid type and those of the betaine type; a nonionic surfactant such as those of the polyethylene glycol type and those of the polyhydric alcohol type; and so forth.

The above-mentioned water-soluble organic solvents include, for example; an alcohol such as a straight-chained alcohol, e.g., methanol, ethanol and 1-propanol, and a branched alcohol such as isopropanol; a ketone such as acetone and methyl ethyl ketone; and so forth.

As for another aqueous cutting fluid, an aqueous emulsion solution may be used. The aqueous emulsion solutions include, for example, an aqueous solution of a polyoxyether, and so forth.

As for a further cutting fluid, a water-soluble organic solvent (without containing water) may be used. The water-soluble organic solvents (without containing water) include, for example; an alcohol such as methanol, ethanol, isopropanol and butanol; a ketone such as acetone and methylethyl ketone; and so forth.

It is also allowed to use a cutting fluid comprising any one of the above-mentioned cutting fluids, in which a rust preventive is contained. As for an aqueous emulsion solution containing a rust preventive, there includes a cutting oil that is specified in JIS K2241 and available on the market under the name of a water-soluble cutting oil Group W1, No. 3.

The rust preventives include, for example, a volatile rust preventive such as dicyclohexyl ammonium nitrite, and a water-soluble rust preventive such as sodium nitrite.

It was preferable to supply the cutting fluids each in amount of not less than $5\times10^{-6}$ ml/mm$^2$, from the viewpoints of excellently performing a cooling function, a lubricating function and washing function. When an amount supplied was not more than $5\times10^{-6}$ ml/mm$^2$, a lubricating function became insufficient, so that a stick-sliplike scratch was produced on the subject surface of a base. (Table 1)

In the invention, the above-mentioned cutting fluid and a cutting tool comprising a single crystal diamond were used. In a preliminary rough processing, a polycrystal diamond sintered compact was used and, in a finishing processing, a cutting tool comprising single crystal diamond was used. The nose configuration thereof may be either a flat shaped or an R-shaped. When an R-curved nose was used, an nose radius was preferable to be within the range of 10 to 30 mm.

The finished surface became precisely mirrorwise. The finished surface accuracy was evaluated in terms of the maximum height Rmax of the surface roughness.

The above-mentioned maximum height Rmax was measured in accordance with the specifications of JIS B-0601-1982. The measurement instrument used therein was a needle-contact type surface roughness tester specified in JIS B0651, that was a "Surface roughness tester SE-30H" manufactured by Kosaka Laboratories, Inc. With the contact needle used therein, the nominal value of the needle point thereof was 2 μm.

The surface-processing conditions were as follows. In the preliminary rough processing, it was preferable that the main spindle revolutions were within the range of 2000 to 6000 rpm, the depths of cut were within the range of 0.1 to 0.2 mm and the feed pitches were of the order of 0.2 mm/rev. In the finish-processing, it was preferable that the main spindle revolutions were within the range of 2000 to 6000 rpm, the depths of cut were each 20 μm and the feed pitches were of the order of 0.25 mm/rev. in the case of the flat-shaped cutting tool and of the order within the range of 0.1 to 0.15 mm/rev in the case of the R-curved cutting tool. The main spindle revolutions were varied according to the outer diameters of the respective tube-shaped base, so that the revolutions could not be specified at wholesale.

There is no special limitation to the machine tools capable of surface-processing a base. However, they include, for example, a lather for processing a base shown in FIG. 1, wherein 1 is a drum-shaped base, 2 is a magnet base, 3 is a holder, 4 is an atomizer, 5 is a jet-nozzle, 6 is a cutting-fluid container, 7 is a air-valve for operational use, and 8 is a cutting tool. When an operator stepped on air valve for operational use 7, the air was fed into atomizer 4, so that a cutting fluid was jet-sprayed in the form of mist from jet-nozzle of cutting fluid container 6 to the portion bringing cutting tool 8 into contact with base 1. The typical examples of the jet-spraying unit for a cutting fluid include, for example, a "Magic-Cut" manufactured by Fuso Seiki Co.

A surface-processed base was then subjected to a washing step. A base surface applied with the surface processing of the invention was readily washable. Therefore, cut chips and the like could easily be washed away in a brush washing having a weak scrubbing force, a ultrasonic washing and a pure water washing. Accordingly, the fixed adhesion of cut chips to a base surface could be satisfactorily prevented. The base passed through the washing step was then subjected to a drying process. As for the drying means, vapor was used for example.

A base of an electrophotographic photoreceptor, that was surface-machining in the process of the invention, was used for constituting an electrophotographic photoreceptor applicable to an electrophotographic copying machine, a digital copier and a laser printer. Such an electrophotographic photoreceptor as mentioned above was constituted by providing, for example, an organic photoreceptive layer having a carrier generation layer and a carrier transport layer on the surface of the base thereof.

The following concrete examples will further be detailed below. It is, however, to be understood that the invention shall not be limited the examples given below.

First, the formation of a base will be detailed.

Base No. 1

Following the conditions given below and while supplying a cutting fluid to the surface of a base, the surface of the base was cut-processed by a cutting tool. Next, it was then washed, so that a surface-machined electrophotographic photoreceptor base machined No. 1 could be obtained. The surface roughness of the resulting base was 0.09 μm Rmax.

(1) Base

There used a base comprising an aluminium material, that was a rotary drum-shaped base comprising A5805 (of the 5000 type) having an outer diameter of 80 mm and a length of 360 mm, manufactured by Nippon Keikinzoku Co. A5805 further contained magnesium in a proportion within the range of 0.6 to 1.0% by weight, silicon in a proportion of not more than 0.06% by weight, iron in a proportion of not more than 0.09% by weight and copper in a proportion of not more than 0.1% by weight, besides aluminium.

(2) Cutting fluid

City water having a specific resistance of 5 kΩ/cm was used.

(3) Amount of cutting fluid supplied

It was supplied so as to be in an amount of 2 ml/min.

(4) Machine tool

Figure 2:
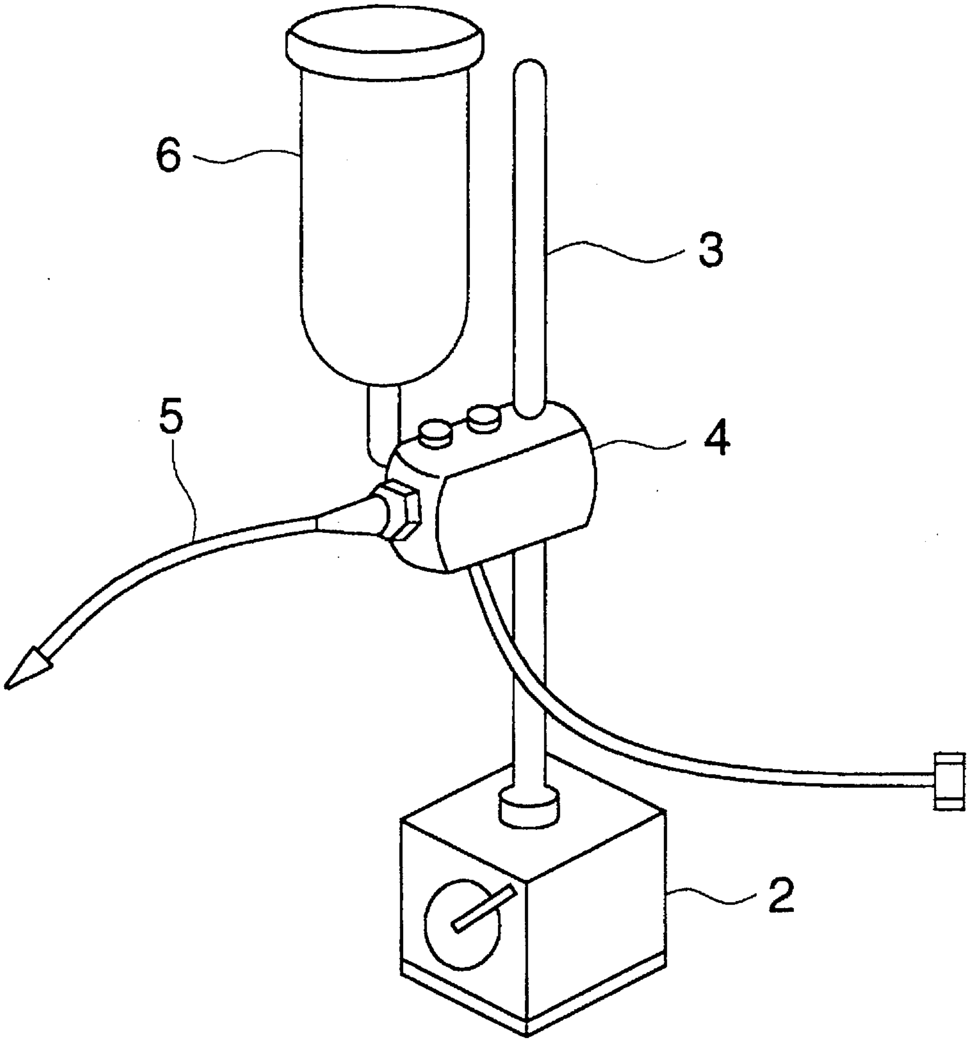
FIG. 2 is a perspective view of a jetting (spray) unit for a cutting fluid.

As the jet-spray unit for the cutting fluid, there used a lathe (shown in FIG. 1) for processing a base having a "Magic-Cut" (manufactured by Fuso Seiki Co.) (shown in FIG. 2).

(5) Cutting tool

In the preliminary rough processing, there used a cutting tool comprising a polycrystal diamond compact having a particle size of 5 μm.

In the finishing process, there used a cutting tool comprising a flat-shaped single crystal diamond.

(6) Processing conditions

In the preliminary rough processing, the main spindle revolutions were set to be 6000 rpm, feed pitch was set to be 0.25 mm/rev., and depth of cut was set to be 0.2 mm.

In the finishing process, the main spindle revolutions were set to be 6000 rpm, feed pitch was set to be 0.25 mm/rev., and depth of cut was set to be 20 μm.

Base No. 2 Through No. 6

The surface-machined base No. 2 through No. 6 for an electrophotographic photoreceptors were each prepared in the same manner as in base No. 1, except that the conditions were replaced by the conditions shown in Table 1 given below. The surface roughness of each resulting base was as shown in Table (1).

Base No. 7

As a comparative example, surface-processed base No. 7 for an electrophotographic photoreceptor was prepared in the same manner as in base No. 1, except that the amount of the cutting fluid supplied was changed into an amount of 1.8 ml/min. The surface roughness of the resulting base was proved to be 0.20 μmRmax, and some fine scratches were observed on the base surface.

Base No. 8

As for another comparative example, surface-machined base No. 8 for an electrophotographic photoreceptor was prepared in the same manner as in base No.1, except that the cutting fluid was changed into an oily "D110" (manufactured by ESSO). The roughness of the resulting base was proved to be 0.08 μm Rmax.

Base No. 9

As for a further comparative example, surface-machined base No. 9 for an electrophotographic photoreceptor was prepared in the same manner as in base No. 1, except that the cutting fluid was changed into an oily "6930 revised" (manufactured by Idemitsu Kosan Co.). The surface roughness of the resulting base was proved to be 0.09 μm Rmax.

Table 1 shows the processing conditions applied to base No. 1 through No. 9 and the results of the roughness of the finished surfaces of the base. The photoreceptor prepared by using a base processed by supplying the cutting fluid not less than $5\times10^{-6}$ ml/cm$^2$ shows good result in surface quality, without scratch.

TABLE 1

| Base No. | Cutting fluid | Nose type of cutting tool | Cutting fluid supply to the surface of the base ($\times10^{-6}$ ml/mm$^2$) | Surface roughness Rmax | Surface quality |
|---|---|---|---|---|---|
| 1 | City water | Flat-shaped | 5.3 | 0.09μm | Uniform |
| 2 | City water | Flat-shaped | 8.0 | 0.08 | Uniform |
| 3 | City water | Flat-shaped | 10.6 | 0.09 | Uniform |
| 4 | Pure water | Flat-shaped | 5.3 | 0.09 | Uniform |
| 5 | City water | R (Nose R = 30 mm) | 5.3 | 0.30 | Uniform |
| 6 | Ion-exchange water | Flat-shaped | 5.3 | 0.09 | Uniform |
| 7 | City water | Flat-shaped | 4.7 | 0.20 | Scratched |
| 8 | D110 | Flat-shaped | 5.3 | 0.08 | Uniform |
| 9 | 6930 revised | Flat-shaped | 5.3 | 0.09 | Uniform |

Now, the preparation of a photoreceptor for a copying machine will be detailed.

By making use of the above-mentioned base s No. 1 through No. 9 of an electrophotographic photoreceptor, there prepared base s No. 1 through No. 9 of an electrophotographic photoreceptor having an organic photoreceptive layer consisting of two function-separated type component layers laminated with a carrier-generation layer and a carrier-transport layer on a sublayer in this order.

(1) Under coating layer

By making use of a coating coposition prepared by dissolving a polyamide resin "X-1874M" (manufactured by Daicell-Hulse Co.) in methanol/1-butanol (=4/1), a 0.3 μm thick sublayer was provided to the top of an aluminium base.

(2) Carrier-generation layer

A coating composition was prepared by dispersing 2.5 parts of CGM-2 having the following chemical structural formula, as a charge-generation substance, and one part of a polyvinyl butyral resin "Elex BX-1" (manufactured by Sekisui Chemical Co.) together with 143 parts of MIPK (or methyl isopropyl ketone) by making use of a sand mill. The resulting uniformly dispersed coating composition was dip-coated on the foregoing sublayer, so that a 0.7 μm thick carrier generation layer was formed.

CGM-2:

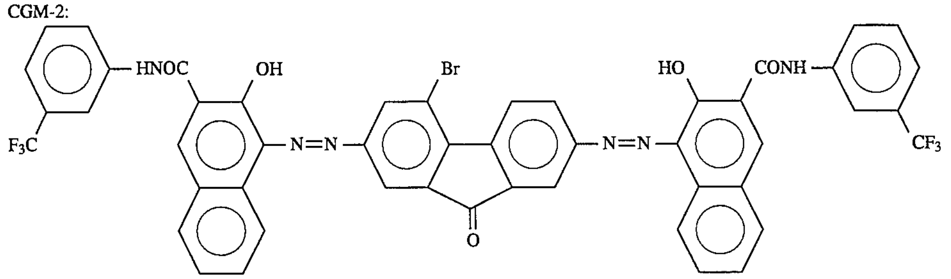

(3) Carrier-transport layer

A coaring composition was prepared in such a manner that 75 parts of CTM-2 having the following chemical structural formula as a charge transport substance, 100 parts of a polycarbonate resin "Iupilon Z300" (having a viscometric average molecular weight of 30,000) (manufactured by Mitsubishi Gas-Chemical Co.), 7 parts of an antioxidant "Sanol LS-2626" (manufactured by Sankyo, Ltd.) and a very small amount of silicone oil "KF-54" (manufactured by Shin-Etsu Chemical Co.) were dissolved in 500 parts of dichloromethane. The resulting composition was dip-coated on the foregoing carrier-generation layer and then dried up, so that a 25 μm-thick carrier-transport layer could be prepared.

CTM-2:

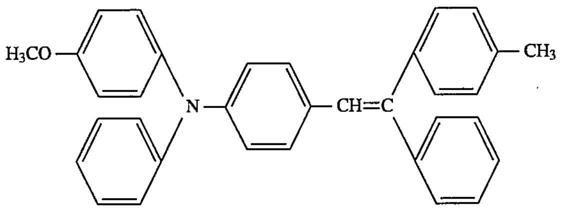

The practical copying tests were each tried so as to form an image on a sheet of plain paper of A4 format, upon loading a copying machine U-Bix U3035 manufactured by Konica Corp. with the foregoing electrophotographic photoreceptors No. 1 through No. 9 as the tests on examples 1 through 6 and comparative examples 1 through 3; and the resulting image qualities, black spots and black streaks were then evaluated. The image qualities were evaluated as ⊚ when no black spot nor fog was produced, O when some black spot was produced but no fog was produced and X when black spot and fog were both produced. The results thereof will be shown in Table 2. In the tests, photoreceptors No. 1 through No. 6 belong to examples 1 through 6 and photoreceptors No. 7 through No. 9 belong to comparative examples 1 through 3, respectively. The photoreceptor prepared by using a base processed by supplying the cutting fluid not less than $5\times10^{-6}$ ml/cm$^2$ shows good result in image quality, black dot and black stream.

TABLE 2

| | Photo-receptor No. | Base No. | Practical test evaluation (thru a copier) Image quality | Black spot, Spots per A4 sht. | Black streak, streaks per A4 sht. |
|---|---|---|---|---|---|
| Inventive example 1 | 1 | 1 | ⊙ | 0 | 0 |
| Inventive example 2 | 2 | 2 | ⊙ | 0 | 0 |
| Inventive example 3 | 3 | 3 | ⊙ | 0 | 0 |
| Inventive example 4 | 4 | 4 | ○ | 2 | 0 |
| Inventive example 5 | 5 | 5 | ○ | 0 | 0 |
| Inventive example 6 | 6 | 6 | ○ | 2 | 0 |
| Comparative example 1 | 7 | 7 | x | — | All over a sheet |
| Comparative example 2 | 8 | 8 | x | >100 | 8 |
| Comparative example 3 | 9 | 9 | x | >100 | 7 |

* In comparative example 1, black spots were not evaluated, because black steaks were produced all over s sheet.

Now, the preparation of a photoreceptor for a laser printer will be detailed. By making use of the base No. 1 through No. 9 of an electrophotographic photoreceptor, there prepared base No. 10 through No. 18 of an electrophotographic photoreceptor having an organic photoreceptive layer consisting of two function-separated type component layers laminated with a carrier-generation layer and a carrier-transport layer on a sublayer in this order.

(1) Sublayer

By making use of toluene and 2-butanone (or MEK) as a coating solvent and Elbax 4260 (or an ethylene type copolymer) as a binder, a sublayer having a thickness of 0.2 μm after dried was provided to the top of an electrophotographic photoreceptor.

(2) Carrier-generation layer

By making use of 2-butanone (or MEK) as a coating solvent, KR-5240 (or a silicone resin) as a binder and τ type non-metallic phthalocyanine as a carrier-generating substance, a carrier-generation layer having a coating amount of 4 $mg/dm^2$ after dried was provided to the top of the above-mentioned sublayer.

(3) Carrier-transport layer

By making use of 1,2-dichloroethane as a coating solvent, Inpilon Z-200 (or polycarbonate BPZ) as a binder, ED-485 (of the styryl triphenylamine type) as a carrier-transporting substance, Irganox-1010 (or pentaerythryl-tetrakis[3-(3,5-di-tertiary butyl-4-hydroxyphenyl)propionate]) as an anti-oxidant and KF-54 (in a 1/10 diluted liquid) as a silicone oil, a carrier-transport layer having a thickness after dried was provided to the top of the above-mentioned carrier-generation layer.

Inventive examples No. 7 through No. 12 and comparative examples No. 4 through No. 6

The practical printing tests were each tried so as to form an image on a sheet of A4 format plain paper in a reversal development process, upon loading a laser printer "LP3115" manufactured by Konica Corp. with the foregoing electrophotographic photoreceptors No. 10 through No. 18; and the resulting image qualities, black spots and black streaks were then evaluated. The charged voltage was applied by $V_H$=450V So as to readily produce black spot, black streak and fog. The image qualities were evaluated as e when no black spot nor fog was produced, O when some black spots were produced but no fog was produced, and x when black spot and fog were both produced. In the tests, photoreceptors No. 10 through No. 15 each belong to examples 7 through 12 and photoreceptors No. 16 through No. 18 each belong to comparative examples 4 through 6, respectively.

The results thereof will be shown in the following Table 3.

TABLE 3

| | Photo-receptor No. | Base No. | Practical test evaluation (LBP) Image quality | Black spot, Spots per A4 sht. | Black streak, streaks per A4 sht. |
|---|---|---|---|---|---|
| Inventive example 7 | 10 | 1 | ⊙ | 0 | 0 |
| Inventive example 8 | 11 | 2 | ⊙ | 0 | 0 |
| Inventive example 9 | 12 | 3 | ⊙ | 0 | 0 |
| Inventive example 10 | 13 | 4 | ○ | 3 | 0 |
| Inventive example 11 | 14 | 5 | ○ | 0 | 0 |
| Inventive example 12 | 15 | 6 | ○ | 2 | 0 |
| Compara tive example 13 | 16 | 7 | x | — | All over a sheet |
| Comparative example 14 | 17 | 8 | x | >100 | 9 |
| Comparative example 15 | 18 | 9 | x | >100 | 8 |

* In comparative example 4, black spots were not evaluated, because black steaks were produced all over s sheet.

The photoreceptor prepared by using a base processed by supplying the cutting fluid not less than $5\times10^{-6}$ $ml/cm^2$ shows good result in image quality, black dot and black stream.

Inventive examples 13 through 36 & comparative examples 7 through 12

The surface-processed electrophotographic photoreceptor base s No. 10 through No. 21 were each prepared in the same manner as in base No. 1, except that the cutting fluid was changed into the cutting fluids shown in the following Table (4).

Base No. 10 through No. 13 are each an example in which an aqueous solution of a water-soluble organic solvent was used as a cutting fluid, respectively. Base No. 14 through No. 19 are each an example in which an aqueous solution of a surfactant was used as a cutting fluid, respectively. And, base s No. 20 and No. 21 are each an example in which an aqueous emulsion solution was used as a cutting fluid, respectively.

As comparative examples, the surface-machined base No. 22 through No. 24 each for an electrophotographic photoreceptor were prepared in the same manner as in base No. 1, except that the cutting fluid was replaced by the cutting fluids shown in the following Table 4 and the cutting fluid supply amount was changed to be 1.8 ml/min. From the resulting base No. 22 through No. 24, the same scratches as produced on base No. 7 were observed on the base surfaces.

The photoreceptor prepared by using a base processed by supplying the cutting fluid not less than $5\times10^{-6}$ ml/cm$^2$ shows good result in specular gloss surface without scratches.

TABLE 4

| Base No. | Solute of cutting fluid (to be mixed in city water) | Concentration (in wt %) | Cutting fluid supply to the surface of the base ($\times10^{-6}$ ml/mm$^2$) | Surface roughness, Rmax | Surface quality |
|---|---|---|---|---|---|
| 10 | Methanol | 10 | 5.3 | 0.09μm | Uniform |
| 11 | Ethanol | 10 | 5.3 | 0.08 | Uniform |
| 12 | Isopropanol | 10 | 5.3 | 0.08 | Uniform |
| 13 | Acetone | 10 | 5.3 | 0.09 | Uniform |
| 14 | Sodium laurylsulfate | 3 | 5.3 | 0.09 | Uniform |
| 15 | Sapamin MS | 3 | 5.3 | 0.08 | Uniform |
| 16 | 15-mol adduct of stearic acid EO | 3 | 5.3 | 0.09 | Uniform |
| 17 | Stearyl dimethyl betaine | 3 | 5.3 | 0.09 | Uniform |
| 18 | RBS48S | 3 | 5.3 | 0.09 | Uniform |
| 19 | $(POE)_5$nonyl-phenol ether | 3 | 5.3 | 0.09 | Uniform |
| 20 | Emulgen 147 | 1 | 5.3 | 0.09 | Uniform |
| 21 | Emulgen 140P | 1 | 5.3 | 0.09 | Uniform |
| 22 | Methanol | 10 | 4.7 | 0.18 | Scratched |
| 23 | $(POE)_5$nonyl-phenol ether | 3 | 4.7 | 0.21 | Scratched |
| 24 | Emulgen 147 | 1 | 4.7 | 0.19 | Scratched |

Sapamin MS: Manufactured by Ciba USA (a cationic surfactant
Stearic acid EO: Stearic acid ethylene oxide
RBS48S: Manufactured by Junsei Chemical Co., Ltd., a nonionic surfactant
Emulgen 147: Manufactured by Kao Corp., polyoxy ether
Emulgen 140P: Manufactured by Kao Corp., polyoxy ether By making use of the resulting electrophotographic photoreceptor base, photoreceptors No. 19 through No. 33 were each prepared in the same manner as in photoreceptor base No. 1 and No. 10, respectively. As shown in Tables 5 and 6, inventive examples 13 through 24 and comparative examples 7 through 9, and inventive examples 25 through 36 and comparative examples 10 through 12 were each evaluated. The results thereof shown in Tables 5 and 6 were obtained.

TABLE 5

| | Photoreceptor No. | Base No. | Practical test evaluation (thru a copier) Image quality | Black spot, Spots per A4 sht. | Black streak, streaks per A4 sht. |
|---|---|---|---|---|---|
| Inventive example 13 | 19 | 10 | ⊙ | 0 | 0 |
| Inventive example 14 | 20 | 11 | o | 3 | 0 |
| Inventive example 15 | 21 | 12 | o | 5 | 0 |
| Inventive example 16 | 22 | 13 | o | 3 | 0 |
| Inventive example 17 | 23 | 14 | o | 2 | 0 |
| Inventive example 18 | 24 | 15 | o | 2 | 0 |
| Inventive example 19 | 25 | 16 | o | 3 | 0 |
| Inventive example 20 | 26 | 17 | o | 2 | 0 |

TABLE 5-continued

| | Photoreceptor No. | Base No. | Practical test evaluation (thru a copier) Image quality | Black spot, Spots per A4 sht. | Black streak, streaks per A4 sht. |
|---|---|---|---|---|---|
| Inventive example 21 | 27 | 18 | ⊙ | 0 | 0 |
| Inventive example 22 | 28 | 19 | o | 3 | 0 |
| Inventive example 23 | 29 | 20 | o | 3 | 0 |
| Inventive example 24 | 30 | 21 | o | 5 | 0 |
| Comparative example 7 | 31 | 22 | x | — | All over a sheet |
| Comparative example 8 | 32 | 23 | x | — | All over a sheet |
| Comparative example 9 | 33 | 24 | x | — | All over a sheet |

* In comparative examples 7 through 9, black spots were not evaluated, because black steaks were produced all over s sheet.

TABLE 6

| | Photo-receptor No. | Base No. | Practical test evaluation (thru an LBP) Image quality | Black spot, Spots per A4 sht. | Black streak, streaks per A4 sht. |
|---|---|---|---|---|---|
| Inventive example 25 | 34 | 10 | ⊙ | 0 | 0 |
| Inventive example 26 | 35 | 11 | ○ | 2 | 0 |
| Inventive example 27 | 36 | 12 | ○ | 5 | 0 |
| Inventive example 28 | 37 | 13 | ○ | 3 | 0 |
| Inventive example 29 | 38 | 14 | ○ | 2 | 0 |
| Inventive example 30 | 39 | 15 | ○ | 4 | 0 |
| Inventive example 31 | 40 | 16 | ○ | 3 | 0 |
| Inventive example 32 | 41 | 17 | ○ | 2 | 0 |
| Inventive example 33 | 42 | 18 | ⊙ | 0 | 0 |
| Inventive example 34 | 43 | 19 | ○ | 3 | 0 |
| Inventive example 35 | 44 | 20 | ○ | 4 | 0 |
| Inventive example 36 | 45 | 21 | ○ | 5 | 0 |
| Comparative example 10 | 46 | 22 | x | — | All over a sheet |
| Comparative example 11 | 47 | 23 | x | — | All over a sheet |
| Comparative example 12 | 48 | 24 | x | — | All over a sheet |

* In comparative examples 10 through 12, black spots were not evaluated, because black steaks were produced all over s sheet.

Inventive examples 37 through 50 and

Comparative examples 13 through 16

Surface-machined base No. 25 through No. 31 for an electrophotographic photoreceptor were each prepared in the same manner as in base No. 1, except that the cutting fluid was replaced by the cutting fluid shown in the following Table 7, respectively. Besides the above, surface-machined base No. 32 and No. 33 for an electrophotographic photoreceptor were prepared as the comparative examples in the same manner as in base No. 1, except that the cutting fluid was replaced by the cutting fluids shown in Table 7 and the cutting fluid supply amount was changed to be 1.8 ml/min., respectively. From base No. 32 and No. 33, the scratches were observed on the base thereof as in base No. 7. The photoreceptor prepared by using a base processed by supplying the cutting fluid not less than 5×10$^{-6}$ ml/cm$^2$ shows good result in specular gloss surface without scratches.

TABLE 7

| Base No. | Cutting fluid | Cutting fluid supply to the surface of the base (×10$^{-6}$ ml/mm$^2$) | Surface roughness Rmax | Surface quality |
|---|---|---|---|---|
| 25 | Methanol | 5.3 | 0.09μm | Uniform |
| 26 | Ethanol | 5.3 | 0.09 | Uniform |
| 27 | Isopropanol | 5.3 | 0.08 | Uniform |

TABLE 7-continued

| Base No. | Cutting fluid | Cutting fluid supply to the surface of the base (×10$^{-6}$ ml/mm$^2$) | Surface roughness Rmax | Surface quality |
|---|---|---|---|---|
| 28 | Butanol | 5.3 | 0.08 | Uniform |
| 29 | Acetone | 5.3 | 0.09 | Uniform |
| 30 | Methyl ethyl ketone | 5.3 | 0.09 | Uniform |
| 31 | Cyclohexanone | 5.3 | 0.08 | Uniform |
| 32 | Methanol | 4.7 | 0.17 | Scratched |
| 33 | Cyclohexanone | 4.7 | 0.16 | Scratched |

By making use of the resulting base for an electrophotographic photoreceptor, photoreceptors No. 49 through No. 57 and No. 58 through No. 66 were each prepared in the same manner as in photoreceptors No. 1 and No. 10. As shown in Tables 8 and 9, inventive examples No. 37 through No. and the comparative examples No. 13 and No. 14, and inventive examples No. 44 through No. 50 and the comparative examples No. 15 and No. 16 were each evaluated, respectively. The results shown in Tables 8 and 9 were obtained therefrom.

TABLE 8

| | Photo-receptor No. | Base No. | Practical test evaluation (thru a copier) Image quality | Black spot, Spots per A4 sht. | Black streak, streaks per A4 sht. |
|---|---|---|---|---|---|
| Inventive example 37 | 49 | 25 | ⊙ | 0 | 0 |
| Inventive example 38 | 50 | 26 | ⊙ | 0 | 0 |
| Inventive example 39 | 51 | 27 | ○ | 2 | 0 |
| Inventive example 40 | 52 | 28 | ○ | 2 | 0 |
| Inventive example 41 | 53 | 29 | ○ | 3 | 0 |
| Inventive example 42 | 54 | 30 | ○ | 3 | 0 |
| Inventive example 43 | 55 | 31 | ○ | 4 | 0 |
| Comparative example 13 | 56 | 32 | x | — | All over a sheet |
| Comparative example 14 | 57 | 33 | x | — | All over a sheet |

* In comparative examples 13 through 14, black spots were not evaluated, because black steaks were produced all over s sheet.

TABLE 9

| | Photo-receptor No. | Base No. | Practical test evaluation (thru an LBP) Image quality | Black spot, Spots per A4 sht. | Black streak, streaks per A4 sht. |
|---|---|---|---|---|---|
| Inventive example 44 | 58 | 25 | ⊙ | 0 | 0 |
| Inventive example 45 | 59 | 26 | ⊙ | 0 | 0 |
| Inventive example 46 | 60 | 27 | ○ | 3 | 0 |

TABLE 9-continued

| | Photo-receptor No. | Base No. | Practical test evaluation (thru an LBP) Image quality | Black spot, Spots per A4 sht. | Black streak, streaks per A4 sht. |
|---|---|---|---|---|---|
| Inventive example 47 | 61 | 28 | ○ | 2 | 0 |
| Inventive example 48 | 62 | 29 | ○ | 2 | 0 |
| Inventive example 49 | 63 | 30 | ○ | 3 | 0 |
| Inventive example 50 | 64 | 31 | ○ | 3 | 0 |
| Comparative example 15 | 65 | 32 | x | — | All over a sheet |
| Comparative example 16 | 66 | 33 | x | — | All over a sheet |

* In comparative examples 15 through 16, black spots were not evaluated, because black steaks were produced all over s sheet.

Inventive examples No. 51 through No. 68 Surface-machined base No. 34 through No. 41 for an electrophotographic photoreceptor were each prepared in the same manner as in base No. 1, except that the cutting fluid was replaced by the cutting fluids shown in Table 10, in which sodium sulfite serving as a water-soluble rust preventive was contained in a proportion of 1% by weight. Besides, surface-processed base No. 42 for an electrophotographic photoreceptor were each prepared in the same manner as in base No. 1, except that the cutting fluid was replaced by Yushiroken EZ-20 serving as an aqueous emulsion solution containing a rust preventive in a proportion of 1% by weight. Yushiroken EZ-20 is commonly used upon diluting it with water 10 times to some ten times the stock solution. However, in the invention, it was diluted with water 100 times or so as thin as the stock solution, from the viewpoint of making a washing step easier after carrying out a surface-machining.

TABLE 10

| Base No. | Cutting fluid | Cutting fluid supply to the surface of the base ($\times 10^{-6}$ ml/mm$^2$) | Surface roughness, Rmax |
|---|---|---|---|
| 34 | City water | 5.3 | 0.08μm |
| 35 | Pure water | 5.3 | 0.09 |
| 36 | Ion-exchange water | 5.3 | 0.09 |
| 37 | Aqueous methanol solution (conc.: 10 wt %) | 5.3 | 0.09 |
| 38 | Aqueous solution of $(POE)_5$ nonylphenol ether (conc.: 3 wt %) | 5.3 | 0.09 |
| 39 | Methanol | 5.3 | 0.09 |
| 40 | Cyclohexane | 5.3 | 0.08 |
| 41 | Emulsion 147 (conc.: 1 wt %) | 5.3 | 0.09 |
| 42 | Yushiroken EZ-20 (conc.: 1 wt %) | 5.3 | 0.08 |

Yushiroken EZ-20: Manufactured by Yushiro Chemical Ind. Co., Ltd., a water-soluble cutting fluid Photoreceptors No. 67 through No. 75 and No. 76 through No. 84 were each prepared in the same manner as in photoreceptor No. 1, and inventive examples 51 through 59 and inventive examples 60 through 68 were each evaluated respectively as shown in Tables 11 and 12. The results thereof were obtained as shown in Tables 11 and 12.

TABLE 11

| | Photo-receptor No. | Base No. | Practical test evaluation (thru a copier) Image quality | Black spot, Spots per A4 sht. | Black streak, streaks per A4 sht. |
|---|---|---|---|---|---|
| Inventive example 51 | 67 | 34 | ◎ | 0 | 0 |
| Inventive example 52 | 68 | 35 | ◎ | 0 | 0 |
| Inventive example 53 | 69 | 36 | ○ | 2 | 0 |
| Inventive example 54 | 70 | 37 | ○ | 2 | 0 |
| Inventive example 55 | 71 | 38 | ○ | 3 | 0 |
| Inventive example 56 | 72 | 39 | ○ | 3 | 0 |
| Inventive example 57 | 73 | 40 | ○ | 4 | 0 |
| Inventive example 58 | 74 | 41 | ○ | 3 | 0 |
| Inventive example 59 | 75 | 42 | ○ | 5 | 0 |

TABLE 12

| | Photo-receptor No. | Base No. | Practical test evaluation (thru an LBP) Image quality | Black spot, Spots per A4 sht. | Black streak, streaks per A4 sht. |
|---|---|---|---|---|---|
| Inventive example 60 | 76 | 34 | ◎ | 0 | 0 |
| Inventive example 61 | 77 | 35 | ◎ | 0 | 0 |
| Inventive example 62 | 78 | 36 | ○ | 2 | 0 |
| Inventive example 63 | 79 | 37 | ○ | 3 | 0 |
| Inventive example 64 | 80 | 38 | ○ | 3 | 0 |
| Inventive example 65 | 81 | 39 | ○ | 4 | 0 |
| Inventive example 66 | 82 | 40 | ○ | 4 | 0 |
| Inventive example 67 | 83 | 41 | ○ | 4 | 0 |
| Inventive example 68 | 84 | 42 | ○ | 5 | 0 |

As described above, according to the surface machining (method) of the invention, an electrophotographic photoreceptor having few black spots, black streaks and local fogginess can be prepared, because a washing step can be made easier after completing the surface machining process.

Because the washing step can easily be performed after completing the surface machining process, it is not necessary to make use of any fleon or chlorine type solvent in the washing liquid, any environmental pollution problem cannot be raised and there is not any danger of suffering any operational safety.

Because an aqueous type cutting fluid has a relatively higher cooling function than in any oily cutting fluids, the tool life can lengthen.

Particularly when making use of a water-soluble organic solvent (without containing water) as a cutting fluid, the tool life can more effectively be lengthened, because the cooling function thereof is substantially much higher.

In addition to the foregoing effects, when a rust preventive is added to each of the above-mentioned cutting fluids, a processed base can effectively be prevented from any pitting corrosion, because the rust preventive is contained.

Because the rust preventive is contained in the cutting fluid, a machine tool can be prevented from any rust possibly produced and the maintenance of the machine tool can be made easier, as compared to the case of making use of an aqueous cutting fluid without containing any rust preventive.

What is claimed is:

1. A method for cutting a surface of a base of a photoreceptor for electrophotography, the method comprising steps of:

(a) supplying an aqueous cutting fluid to the surface of the photoreceptor base in mist form;

(b) cutting the surface of the photoreceptor base by a cutting tool comprising a monocrystal diamond, wherein an amount of said aqueous cutting fluid being supplied is not less than $5\times10^{-6}$ ml/mm$^2$.

2. The method of claim 1 wherein said aqueous cutting fluid is water only.

3. The method of claim 1 wherein said aqueous cutting fluid is water containing a water-soluble organic solvent or a surfactant.

4. The method of claim 1 wherein said aqueous cutting fluid is a water-soluble organic solvent only.

5. The method of claim 3 wherein said water-soluble organic solvent is methanol.

6. The method of claim 1 wherein said aqueous cutting fluid contains a rust inhibitor.

7. The method of claim 1 wherein said base of said photoreceptor comprises an Aluminum material.

8. An apparatus for cutting a surface of a base of a photoreceptor for electrophotography comprising:

(a) a cutting device having monocrystal diamond head;

(b) a supply device for furnishing an aqueous cutting fluid to the surface of the photoreceptor base in mist form;

wherein an amount of said aqueous cutting fluid being supplied is not less than $5\times10^{-6}$ ml/mm$^2$.

9. The apparatus of claim 7 wherein said aqueous cutting fluid is water only.

10. The apparatus of claim 7 wherein the aqueous cutting fluid is water containing a water-soluble organic solvent or a surfactant.

11. The apparatus of claim 7 wherein the aqueous cutting fluid is a water-soluble organic solvent.

12. The apparatus of claim 9 wherein said water-soluble organic solvent is methanol.

13. The apparatus of claim 7 wherein the aqueous cutting fluid contains a rust inhibitor.

14. The apparatus of claim 7 wherein the base of photoreceptor comprises an aluminum material.

* * * * *